US011912851B2

(12) United States Patent
Soares et al.

(10) Patent No.: US 11,912,851 B2
(45) Date of Patent: Feb. 27, 2024

(54) POLYOLEFINS HAVING IMPROVED DIMENSIONAL STABILITY IN THREE-DIMENSIONAL PRINTING, ARTICLES FORMED THEREFROM, AND METHODS THEREOF

(71) Applicant: Braskem America, Inc., Philadelphia, PA (US)

(72) Inventors: Juliana Breda Soares, Triunfo (BR); Michelle K. Sing, Stoneham, MA (US); Jacob Fallon, São Paulo (BR); Alexandre di Pintor da Luz, Camaçari (BR); Leonardo Ito, Triunfo (BR); Hadi Mohammadi, Philadelphia, PA (US)

(73) Assignee: Braskem America, Inc., Philadelphia, PA (US)

( * ) Notice: Subject to any disclaimer, the term of this patent is extended or adjusted under 35 U.S.C. 154(b) by 190 days.

(21) Appl. No.: 17/321,108

(22) Filed: May 14, 2021

(65) Prior Publication Data
US 2021/0355309 A1 Nov. 18, 2021

Related U.S. Application Data

(60) Provisional application No. 63/025,597, filed on May 15, 2020.

(51) Int. Cl.
*C08L 23/16* (2006.01)
*B33Y 70/10* (2020.01)
(Continued)

(52) U.S. Cl.
CPC ............ *C08L 23/16* (2013.01); *B29C 64/118* (2017.08); *B33Y 10/00* (2014.12); *B33Y 30/00* (2014.12);
(Continued)

(58) Field of Classification Search
CPC .. C08L 23/16; C08L 2207/02; C08L 2205/24; C08L 2205/242; B33Y 30/00; B33Y 70/00
See application file for complete search history.

(56) References Cited

U.S. PATENT DOCUMENTS

| 4,259,456 | A | * | 3/1981 | Yamada | ............... | C08K 5/3442 |
| | | | | | | 524/157 |
| 6,489,019 | B1 | * | 12/2002 | Shah | .................... | C08K 5/0083 |
| | | | | | | 264/173.14 |

(Continued)

FOREIGN PATENT DOCUMENTS

| DE | 102015211632 A1 | | 12/2016 | | |
| EP | 2471858 A1 | * | 7/2012 | .............. | C08L 23/10 |

(Continued)

OTHER PUBLICATIONS

International Search Report and Written Opinion issued in corresponding International Application No. PCT/US2021/032610, dated Sep. 14, 2021 (14 pages).

*Primary Examiner* — Rip A Lee
(74) *Attorney, Agent, or Firm* — Osha Bergman Watanabe & Burton LLP

(57) ABSTRACT

A compounded polymer composition suitable for manufacturing of isotropic three-dimensional printed articles may include an impact copolymer, a low crystalline ethylene/α-olefin copolymer; a nucleating agent; and filler, where the impact copolymer may include a matrix phase comprising a propylene-based polymer or copolymer; and a dispersed phase in the matrix phase, the dispersed phase comprising an ethylene-based copolymer, the ethylene-based copolymer having a C3-C12 comonomer, wherein the dispersed phase has a different composition than the matrix phase.

18 Claims, 3 Drawing Sheets

(51) Int. Cl.
  *B33Y 10/00* (2015.01)
  *B33Y 30/00* (2015.01)
  *B29C 64/118* (2017.01)
  *C08L 23/08* (2006.01)
  *C08L 23/14* (2006.01)
  *B29K 23/00* (2006.01)
  *C08K 3/34* (2006.01)

(52) U.S. Cl.
  CPC .......... *B33Y 70/10* (2020.01); *C08L 23/0815* (2013.01); *C08L 23/14* (2013.01); *B29K 2023/06* (2013.01); *B29K 2023/14* (2013.01); *B29K 2023/16* (2013.01); *C08K 3/34* (2013.01); *C08L 2205/24* (2013.01); *C08L 2207/02* (2013.01)

(56) References Cited

U.S. PATENT DOCUMENTS

| | | | |
|---|---|---|---|
| 8,329,825 B2 | 12/2012 | Mori et al. | |
| 8,569,412 B2* | 10/2013 | Posch | C08L 23/10 |
| | | | 524/495 |
| 9,039,953 B2 | 5/2015 | Kraibuhler et al. | |
| 9,074,082 B2* | 7/2015 | Wang | C08L 23/0815 |
| 9,475,927 B2* | 10/2016 | Wang | B29C 45/0001 |
| 11,680,158 B2* | 6/2023 | Clark | B33Y 10/00 |
| | | | 525/240 |
| 2018/0201756 A1* | 7/2018 | Watson | G02B 6/443 |

FOREIGN PATENT DOCUMENTS

| | | | | |
|---|---|---|---|---|
| WO | WO 2011/076553 A1 * | 6/2011 | ............. | C08L 23/14 |
| WO | 2015/019212 A1 | 2/2015 | | |
| WO | 2019092498 A1 | 5/2019 | | |
| WO | 2019/210236 A1 | 10/2019 | | |

* cited by examiner

20 μm

20 μm

20 μm

POLYOLEFINS HAVING IMPROVED DIMENSIONAL STABILITY IN THREE-DIMENSIONAL PRINTING, ARTICLES FORMED THEREFROM, AND METHODS THEREOF

BACKGROUND

Rapid prototyping or rapid manufacturing processes are manufacturing processes that aim to convert available three-dimensional CAD data directly and rapidly into workpieces, as far as possible without manual intervention or use of a mold. In rapid prototyping, construction of the part or assembly is usually done in an additive, layer-by-layer fashion. Those techniques that involve fabricating parts or assemblies in an additive or layer-by-layer fashion are termed "additive manufacturing" (AM), as opposed to traditional manufacturing methods which are mostly reductive in nature. Additive manufacturing is commonly referred to by the general public as "3D printing".

There are currently several basic AM technologies: material extrusion, material jetting, binder jetting, material jetting, vat photopolymerization, sheet lamination, powder bed fusion and directed energy deposition. The most widely used of these AM technologies is based on material extrusion. While some variations exist, this technology generally involves feeding a thermoplastic polymer in the form of a continuous filament into a heated nozzle, where the thermoplastic filament becomes a viscous melt and can be therefore extruded. The 3-dimensional motion of the nozzle or the extruder assembly is precisely controlled by step motors and computer aided manufacturing (CAM) software. The first layer of the object is deposited on a build substrate, whereas additional layers are sequentially deposited and fused (or partially fused) to the previous layer by solidification due to a drop in temperature. The process continues until a 3-dimensional part is fully constructed. The process may also involve a temporary support material that provides support to the part being built and is subsequently removed from the finished part by mechanical means or dissolution in a suitable liquid medium. This process is commonly referred to as fused deposition modeling (FDM) or fused filament fabrication (FFF). There are several thermoplastic polymers that are currently being used in material extrusion based AM processes, such as FDM or FFF. Those materials include acrylonitrile-butadiene-styrene (ABS), poly(lactic acid) (PLA), polycarbonate (PC), polystyrene (PS), high impact polystyrene (HIPS), polycaprolactone (PCL), and polyamide as well as some other polymeric materials. However, the most commonly used materials are ABS and PLA.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a compounded polymer composition suitable for manufacturing of isotropic three-dimensional printed articles that includes an impact copolymer, a low crystalline ethylene/α-olefin copolymer; a nucleating agent; and filler, where the impact copolymer may include a matrix phase comprising a propylene-based polymer or copolymer; and a dispersed phase in the matrix phase, the dispersed phase comprising an ethylene-based copolymer, the ethylene-based copolymer having a C3-C12 comonomer, wherein the dispersed phase has a different composition than the matrix phase.

In another aspect, embodiments disclosed herein relate to a three-dimensional printed article formed from a compounded polymer composition suitable for manufacturing of isotropic three-dimensional printed articles that includes an impact copolymer, a low crystalline ethylene/α-olefin copolymer; a nucleating agent; and filler, where the impact copolymer may include a matrix phase comprising a propylene-based polymer or copolymer; and a dispersed phase in the matrix phase, the dispersed phase comprising an ethylene-based copolymer, the ethylene-based copolymer having a C3-C12 comonomer, wherein the dispersed phase has a different composition than the matrix phase.

In another aspect, embodiments disclosed herein relate to a three-dimensional printed article formed from a compounded polymer composition, the printed article having a unidimensional shrinkage of less than 1.0% in each of the flow direction and the direction normal to the flow direction, an isotropic shrinkage ratio in the range of 0.8 to 1.2, a coefficient of linear thermal expansion, measured according to ASTM E381 at 100° C., of less than 150 μm/m ° C.

In another aspect, embodiments disclosed herein relate to a filament for a three-dimensional printer that includes a compounded polymer composition that includes an impact copolymer, a low crystalline ethylene/α-olefin copolymer; a nucleating agent; and filler, where the impact copolymer may include a matrix phase comprising a propylene-based polymer or copolymer; and a dispersed phase in the matrix phase, the dispersed phase comprising an ethylene-based copolymer, the ethylene-based copolymer having a C3-C12 comonomer, wherein the dispersed phase has a different composition than the matrix phase.

In yet another aspect, embodiments disclosed herein relate to a method for manufacturing a solid article by three-dimensional printing that includes: (1) supplying a filament to a printing head; (2) ejecting a hot melt of the filament from the printing head; (3) solidifying the melt to form a printing layer; and (4) repeating (1) to (3) to create a stack of printing layers, where the filament includes a compounded polymer composition that includes an impact copolymer, a low crystalline ethylene/α-olefin copolymer; a nucleating agent; and filler, where the impact copolymer may include a matrix phase comprising a propylene-based polymer or copolymer; and a dispersed phase in the matrix phase, the dispersed phase comprising an ethylene-based copolymer, the ethylene-based copolymer having a C3-C12 comonomer, wherein the dispersed phase has a different composition than the matrix phase.

In another aspect, embodiments disclosed herein relate to an extruded pellet for a three-dimensional printer that includes a compounded polymer composition that includes an impact copolymer, a low crystalline ethylene/α-olefin copolymer; a nucleating agent; and filler, where the impact copolymer may include a matrix phase comprising a propylene-based polymer or copolymer; and a dispersed phase in the matrix phase, the dispersed phase comprising an ethylene-based copolymer, the ethylene-based copolymer having a C3-C12 comonomer, wherein the dispersed phase has a different composition than the matrix phase.

In yet another aspect, embodiments disclosed herein relate to a method for manufacturing a solid article by three-dimensional printing that includes (1) supplying a pellet to a printing head; (2) ejecting a hot melt of the pellet from the printing head; (3) solidifying the melt to form a printing layer; and (4) repeating (1) to (3) to create a stack of printing layers, where the pellet includes a compounded polymer composition that includes an impact copolymer, a low crystalline ethylene/α-olefin copolymer; a nucleating agent; and filler, where the impact copolymer may include a matrix phase comprising a propylene-based polymer or copolymer; and a dispersed phase in the matrix phase, the dispersed phase comprising an ethylene-based copolymer, the ethylene-based copolymer having a C3-C12 comonomer, wherein the dispersed phase has a different composition than the matrix phase.

Other aspects and advantages of the claimed subject matter will be apparent from the following description and the appended claims.

DETAILED DESCRIPTION

Figure 1:
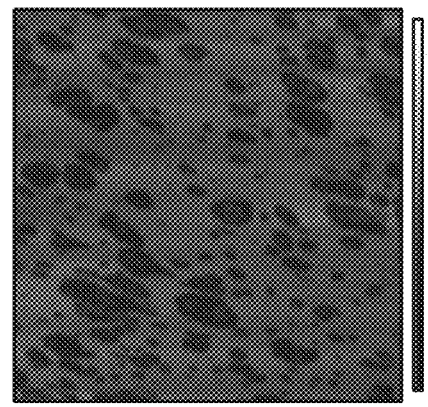
FIGS. 1-3 show SEM images of example polymer compositions.

Embodiments of the present disclosure are directed to compounded polymer compositions, granules (e.g., pellets) or filaments thereof, articles manufactured therefrom, and methods of use thereof. In particular, embodiments disclosed herein relate to polymer compositions used in additive manufacturing, and the associated filaments or granules thereof, the articles printed therefrom, and methods of use thereof.

Conventional polymers used in estrusion-based additive manufacturing technologies include amorphous polymers, for example, PLA and ABS, due to greater dimensional stability they provide during the additive manufacturing extrusion process. Additive manufacturing technologies intrinsically expose the material to repeated heating cycles and generate residual stress, which represent a challenge for maintaining consistency in the printed object. Further, when using semi-crystalline polymers, its high-volume contraction during polymer cooling caused by crystal formation and packaging lead to an even more challenging condition to keep consistency between the virtual project and the final printed part. Thus, polyolefins are generally not used in material extrusion additive manufacturing technology because the articles, as each successive layer is deposited and cools, exhibit shrinkage, warpage, and/or curling (at the edges and corners), for example. However, embodiments of the present disclosure are directed to compounded polyolefin compositions that exhibit reduced physical distortion during material extrusion additive manufacturing relative to conventional polyolefins and also provide for the intrinsic advantages of using polypropylene, including low density, chemical and moisture resistance, and strength and fatigue resistance (living-hinge properties).

In one or more embodiments, the compounded polymer composition suitable for use in additive manufacturing may include a heterophasic copolymer having a polyolefin matrix phase and a dispersed phase. These two-phase materials may also be referred to as impact copolymers or ICPs. Advantageously, the present inventors have found that when the ICPs are compounded with a synergistic combination of a low crystalline ethylene/α-olefin copolymer, a nucleating agent, and a filler, a particularly good balance of properties may be achieved. In particular, articles printed from the present compounded compositions may have less unidirectional shrinkage and more isotropic shrinkage, while also having a lower coefficient of linear thermal expansion, as compared to the ICP alone or the ICP with the individual additive components. As used herein, "isotropic shrinkage" refers to shrinkage in at least two directions, and is therefore reported herein as a ratio between two unidirectional shrinkage values measured in orthogonal directions.

The ICP's polyolefin matrix phase may have high crystallization kinetics that allow for rapid crystallization of the matrix that is combined with the dispersed phase, which is amorphous, and is compounded, as described herein to exhibit low unidimensional shrinkage (equivalently referred to as unidirectional shrinkage or unidirectional change). Such combination may allow for an overall polymer composition that avoids the physical distortion typical for polyolefins used in additive manufacturing processes/systems. Moreover, the inclusion of the synergistic additives in combination with the ICP may result in a high nucleation density and a desirable dimensionality (and growth dimensionality), which the present inventors believe advantageously contribute to the low and isotropic shrinkage. For example, the compounded polymer composition, when printed, may have a plurality of crystals dispersed therein, where the plurality of crystals have a dimensionality, measured according to the Avrami growth dimensionality value (n) of less than 4. In more particular embodiments, the dimensionality may be less than 3.0, 2.5, or 2.2 or range from 1.9 to 2.1.

Further, with respect to nucleation density, the compounded polymer composition may have a greater nucleation density relative to a reference impact copolymer (being the impact copolymer used in the compounded polymer composition). In one or more embodiments, a ratio of the nucleation density (ND) of the compounded polymer composition to the ICP satisfies the following:

$$\frac{ND_{compound}}{ND_{impact\ copolymer}} \geq 4$$

wherein ND is measured according the Avrami method and $ND_{compound}$ refers to the nucleation density of the compounded polymer composition and $ND_{impact\ copolymer}$ refers to the nucleation density of a comparative impact copolymer.

Conventional polyolefin compositions may exhibit a unidimensional shrinkage of 1.8% or more (determined as the ratio of the difference between the as-molded and final (cooled) length relative to the as-molded length). In contrast, one or more embodiments of the present disclosure, wherein the compounded polymer composition exhibits high ratios of the ND, may have a unidimensional shrinkage of less than 1.0% in each of the flow direction and the direction normal to the flow direction, or even less than 0.97%, 0.85%, or 0.75%, 0.5%, or even 0.05%, in embodiments.

Further, one or more embodiment of the present disclosure may exhibit low warpage. Warpage in printed articles is related to unidimensional shrinkage in injection molded articles, but considers shrinkage in the three dimensions of an article, not just a single direction. Thus, an article may exhibit shrinkage, but so long as the shrinkage is isotropic or substantially isotropic, the article may have low warpage. Isotropic shrinkage (and thus warpage) may be expressed as a ratio of the shrinkage in the flow direction (as the article is produced) to the shrinkage in the transverse direction (transverse to the flow). One or more embodiments of the present disclosure may have an isotropic shrinkage ratio that is greater than or equal to 0.8 and less than or equal to 1.2. Further, in more particular embodiments, the lower limit may be any of 0.8, 0.82, 0.84, 0.86, 0.88, 0.9, 0.92, 0.94, 0.96, 0.98 or 1.0 and the upper limit may be any of 1.2, 1.18, 1.16, 1.14, 1.12, 1.1, 1.08, 1.06, 1.04, 1.02, or 1.0 where any lower limit may be used in combination with any upper limit.

In one or more embodiments, the compounded polymer composition may have a warpage of less than 10 mm, or 5.5 mm, measured as the flection on the center of a printed tensile bar specimen relative to a flat surface. The tensile bars were printed in X-Y direction under the following conditions: printing temperature 220° C., bed temperature 23° C., print speed 4000 mm/min, 75% of grid (±45°) infill, 3 perimeter layers, 0.35 mm nozzle and 0.15mm layer height, 100% of cooling. In more particular embodiments, such warpage may be less than 5 mm, 4 mm, or 3 mm.

In one or more embodiments, the compounded polymer composition may have a coefficient of linear thermal expansion, measured according to ASTM E381 at 100° C., of less than 150 μm/m° C. One or more embodiments may have a coefficient of linear thermal expansion of less than 140 or 130 μm/m° C.

Applicants believe the low shrinkage/warpage may result from rapid crystallization kinetics for the matrix phase of a heterophasic copolymer. In one or more embodiments, the compounded polymer composition may have a matrix phase having a crystallization half-time (tc½), measured at 30° C. undercooling (30° C. under the melting temperature) on an isothermal DSC, is less than 60 minutes. One or more embodiments may have a crystallization half-time of less than 50 minutes, less than 40 minutes, or less than 30 minutes.

In one or more embodiments, the compounded polymer composition may have a crystallization half-time, measured at 140° C., of less than 3.6 minutes, less than 3.4 minutes, or less than 3.3 minutes.

Further, the crystallinity ($X_c$) of the compounded polymer composition, measured by DSC according to ASTM E793, may be less than 44% in one or more embodiments, or less than 42, 40, 38 or 36% in one or more embodiments.

Impact Copolymer

In one or more embodiments, compounded polymer compositions may include an impact copolymer in an amount ranging from 50 to less than 90 wt % of the total compounded composition. For example, the impact copolymer may be present at a lower limit of any of 50, 60, 70, or 75 wt %, and an upper limit of any of 85, 88, or 90 wt %, where any lower limit can be used in combination with any upper limit.

In one or more embodiments, compounded polymer compositions may include ICPs that include at least two major component phases, including a matrix polymer that forms a substantial proportion of the final ICP polymer composition.

The ICP matrix polymer may be propylene. "Polypropylene" shall mean polymers comprising greater than 50% by weight of units which have been derived from propylene monomer. This includes polypropylene homopolymers or copolymers (meaning units derived from two or more comonomers).

Matrix polymers in accordance with the present disclosure include polymers and copolymers derived from propylene monomers and one or more comonomers including ethylene and alpha-olefins such as 1-butene, 1-pentene, 1-hexene, 1-heptene, 1-octene, 1-nonene, 1-decene, 1-undecene, 1-dodecene, and the like, such as in a random copolymer. Comonomers may form less than 50 wt % of the copolymer (i.e., propylene forms greater than 50 wt % of the units of a copolymer). In one or more embodiments, a matrix polymer may include a combination of one or more homopolymers or copolymers that may be blended pre-or post-polymerization in a reactor. The matrix phase in accordance with the present disclosure may be unimodal or multimodal. The term "multimodal" means a polymer that comprises at least two polymer fractions which have been produced under different polymerization conditions resulting in different comonomer content and/or molecular weights distribution.

In one or more embodiments, the matrix polymer may have a mole percent (mol %) of propylene that ranges from a lower limit selected from 50, 55, 60, or 80 mol %, to an upper limit selected from 85, 90, 95, or 100 mol %, where any lower limit may be combined with any upper limit, and where the balance of the mol % of the matrix polymer may be contributed from one or more comonomers.

Matrix polymers in accordance with the present disclosure may contain a mole percent (mol %) of comonomer that ranges from a lower limit selected from any of 0, 0.5, 1, and 1.5 mol %, to an upper limit selected from any of 2.5, 5, 7.5, and 10 mol %, where any lower limit may be paired with any upper limit. However, more or less comonomer may be added depending on the particular application for the polymer. For example, stiffness may be improved by decreasing the amount of comonomers such as α-olefins, while impact resistance and melt strength may be improved with increasing comonomer content. In some embodiments, the matrix is a propylene/alpha olefin random copolymer optionally comprising from 0.01 wt. % to 5 wt. %, for example, less than about 2.0 wt. %, of ethylene.

The matrix polymer may be included at a percent by weight (wt %) of the final polymer composition that ranges from a lower limit selected from any of 50, 60, and 70 wt %, to an upper limit selected from any of 75, 85, and 95 wt %, where any lower limit may be paired with any upper limit.

As mentioned above, the matrix phase may be semi-crystalline, such as having a crystallinity (measured using DCS crystallinity or xylene insoluble content) that ranges from 60 to 80 weight percent of the matrix phase. However, given that the matrix phase is part of an impact copolymer with a dispersed phase, the overall crystallinity of the ICP, measured as the DSC crystallinity, may range from 25 to 80 wt %. Further, in one or more embodiments, the lower limit may range from any of 25, 30, 35 or 40 wt %, with an upper limit ranging from 60, 65, 70, 75, or 80 wt percent, where any lower limit can be used in combination with any upper limit.

In one or more embodiments, the ICP may have a xylene soluble content, measured according to ASTM 5492-06, ranging from 20 to 40 wt %, including having a lower limit of any of 20 or 25% and an upper limit of any of 35 or 40%, where any lower limit can be used in combination with any upper limit.

"Melt index" or "melt flow rate" (units of g/10 min. or dg/min.) is described according to, and measured per, ASTM D1238 using a load of 2.16 kg at 230° C. In some embodiments, the matrix phase has a melt index of from about 0.3 g/10 min. to about 200 g/10min. The bulk polymer has a melt index of from about 0.25 g/10min. to about 150 g10/min. In one or more embodiments, the matrix phase has a melt index value of 10 to 50 g/10 min., preferably from 15 to 35 g/10 min., measured according to ASTM D1238.

The ICPs in accordance with the present disclosure may include a dispersed phase that increases the impact resistance and modifies other physical properties such as melt flow rate (MFR), melt strength (MS), and the like. Further, the dispersed phase may be amorphous, which serves in contrast to the semi-crystalline matrix phase. Thus, in an additive manufacturing process, upon depositing a "layer" of polymer material, the matrix phase begins to crystallize (quickly), and the dispersed phase exhibits low shrinkage.

The dispersed copolymer phase comprises from 5 to 50 weight % of the ICP. In general, the dispersed copolymer phase may comprise at least 5, 10, 15, 20, or 25% by weight of the ICP, and in general, no more than 50, 40, 35, 30, 25 or 20% by weight of the ICP. In specific embodiments, the dispersed copolymer phase may comprise from about 10 to 50 percent by weight or even from about 10 to 40 percent by weight of the ICP. The dispersed copolymer phase of the present ICPs may comprise one or more individual polymers (whether in-reactor or post reactor blends). The dispersed copolymer phase may take any shape including, for example, spherical, elongate, or otherwise non-spherical shape.

In one or more embodiments, rubbers suitable for use as a dispersed phase include copolymers having ethylene and one or more monomers, such as a C3-C12 comonomer. In some embodiments, the internal rubber phase of an ICP composition may be an ethylene-propylene rubber (EPR), which may in include EPRs having one or more comonomers in addition to ethylene and propylene. Other comonomers may include, for example, α-olefins such as 1-butene, 1-pentene, 1-hexene, 1-heptene, 1-octene, 1-nonene, 1-decene, 1-undecene, 1-dodecene, and the like. In one or more embodiments, the ethylene may be present as a comonomer in the internal rubber phase in an amount that ranges from 20 to 55 weight percent, or a lower limit of any of 20, 25, or 30 weight percent and an upper limit of any of 45, 50, or 55 weight percent, where any lower limit can be used in combination with any upper limit.

ICPs in accordance with the present disclosure may include a dispersed phase containing multiple rubber polymers. According to the present invention, the dispersed copolymer phase comprises a blend of at least two copolymers, namely a first copolymer of ethylene and a C3-C12 alpha-olefin and a second copolymer of ethylene and a C3-C12 alpha-olefin. According to the present invention, the dispersed copolymer phase comprises from 40 to 90 percent by weight of a first copolymer, in other embodiments from 50 to 80 percent by weight of a first copolymer, or even from about 60 to 70 percent by weight of a first copolymer; and the dispersed copolymer phase comprises from 10 to 60 percent by weight of a second copolymer, in other embodiments from 20 to 50 percent by weight of the second copolymer, or even from about 30 to 40 percent by weight of the second copolymer. According to one or more embodiments, the weight percent of ethylene in the second copolymer may be greater than the weight percent of ethylene in the first copolymer. It is within the scope of the present disclosure for the dispersed copolymer phase to further comprise a third, fourth or even fifth copolymer of ethylene and an alpha-olefin.

When using ethylene as a comonomer in the ICP (either as a comonomer in the matrix phase or the dispersed phase), the total amount of ethylene, measured according to ASTM D5576, may range of 5 to 30 percent, or a lower limit of any of 5, 10, or 15 percent, and an upper limit of any of 20, 25, or 30 percent, where any lower limit can be used in combination with any upper limit.

In some embodiments, the intrinsic viscosity (IV) of the dispersed phase may be modified to tune the MS and MFR of the final ICP, for example, to modify polymer performance. In one or more embodiments, the IV for the dispersed phase may be in the range of 1.0 to 7.5 dl/g, whereas the IV for the matrix phase may be in the range of 1.0 to 4.0 dl/g. Further, in one or more embodiments, such IV of the dispersed phase may be higher than the IV of the matrix phase, i.e., it may have a viscosity ratio of greater than 1.

In some embodiments, the ICP comprising the matrix phase and the dispersed phase is made through an in-reactor process. The monomers are feed into a reactor for polymerization, and a resulting polymer composition having the two-phase structure described herein is obtained. In some other embodiments, the polymer composition comprising the matrix phase and the dispersed phase is made through a post-reactor process by blending a first polymer ingredient and a second polymer ingredient. The first polymer ingredient mainly contributes to the matrix phase while the second polymer ingredient mainly contributes to the dispersed phase. In one or more embodiments, the ICP may be made using Ziegler-Natta catalyst in an in-reactor solution.

For example, the propylene impact copolymer can be made using one or more matrix phase polymerization steps, occurring in one or more gas phase reactors; one or more dispersed phase polymerization steps, occurring in one or more liquid phase reactors; and at least one de-gassing step. In some embodiments, the propylene ICP is made in an in-reactor comprising monomer including propylene and a comonomer such as ethylene. In the one or more matrix phase polymerization steps, alpha-olefin may be used as a comonomer. Examples of a suitable alpha-olefin include but are not limited to butene, pentene, hexene and heptene. The polymerization is catalyzed with Ziegler-Natta catalyst.

Catalysts employed in the polymerization of α-olefins may be characterized as supported catalysts or unsupported catalysts, sometimes referred to as homogeneous catalysts. The so-called conventional Ziegler-Natta catalysts are stereospecific complexes formed from a transition metal halide and a metal alkyl or hydride, such as titanium tetrachloride supported on an active magnesium dichloride. A supported catalyst component includes, but is not necessarily limited to, titanium tetrachloride supported on an "active" anhydrous magnesium dihalide, such as magnesium dichloride or magnesium dibromide. A supported catalyst component may be employed in conjunction with a co-catalyst such as an alkylaluminum compound, for example, triethylaluminum (TEAL). The Ziegler-Natta catalysts may also incorporate an electron donor compound that may take the form of various amines, phosphenes, esters, aldehydes, and alcohols.

Some of the compositions of the present invention are prepared in a sequential polymerization process wherein a propylene based polymer (defined as the ICP "matrix") is prepared first, followed by the preparation of a copolymer rubber. The composition described herein can be prepared using a Ziegler-Natta catalyst, a co-catalyst such as triethylaluminum ("TEA"), and optionally an electron donor including the non-limiting examples of dicyclopentyldimethoxysilane ("DPCMS"), cyclohexylmethyldimethoxysilane ("CMDMS"), diisopropyldimethoxysilane ("DIPDMS"), di-t-butyldimethoxysilane, cyclohexylisopropyldimethoxysilane, n-butylmethyldimethoxysilane, tetraethoxysilane, 3,3,3-trifluoropropylmethyldimethoxysilane, mono and di-alkylaminotrialkoxysilanes or other electron donors known in the art or combinations thereof. Examples of different generation Ziegler-Natta catalysts that can be applied to the practice of the present disclosure are described in the "Polypropylene Handbook" by Nello Pasquini, 2nd Edition, 2005, Chapter 2 and include, but are not limited to, phthalate-based, di-ether based, succinate-based catalysts or combinations thereof. The catalyst system may be introduced at the beginning of the polymerization of propylene and is transferred with the resulting propylene based polymer to the copolymerization reactor where it serves to catalyze the gas phase copolymerization of propylene and ethylene (or a higher alpha-olefin) to produce the rubber phase.

Compositions can also be blends of the ethylene-propylene rubber (EPR) elastomer (or other ethylene-alpha olefin copolymer) with polypropylene homopolymer and random copolymer. These compositions can be made by blending or otherwise dispersing particles of EPR elastomer into a matrix of the propylene-based polymer. The propylene-based polymer and the EPR elastomer may be combined by way of dry blending and/or melt blending.

As is generally known in the art, hydrogen may be added to any of the reactors to control molecular weight, intrinsic viscosity and melt flow rate (MFR) of the polymeric composition within the reactor. In certain embodiments, the composition of the dispersed rubber phase may be controlled (typically in the second reactor) by the ratio of the alpha-olefin comonomers and the amount of hydrogen. According to certain embodiments, the overall melt flow rate of the ICP polymer composition may be greater than or equal to 0.25 g/10 min. In other embodiments, the overall melt flow rate of the ICP polymer composition may be between 0.25 g/10 min and 150 g/10 min, and in other embodiments between 2 g/10 min and 75 g/10 min.

In one or more embodiments, an ICP composition may be further combined with other additives such as anti-oxidants, acid scavengers, nucleating agents, and the like. In some embodiments, the additives may be added prior to combination of the matrix polymer with the internal rubber phase.

Low Crystallinity Ethylene/α-Olefin Copolymer

As mentioned above, the compounded polymer compositions may include a low crystallinity ethylene/α-olefin copolymer. For example, such copolymers may be non-crystalline or a low-crystallinity random or block copolymers of ethylene and one or more comonomers, such as a $C_3$-$C_{12}$ comonomers. In some embodiments, the low crystallinity ethylene/α-olefin copolymer may be an ethylene-butylene elastomer. Other comonomers may include, for example, α-olefins such as propene, 1-pentene, 1-hexene, 1-heptene, 1-octene, 1-nonene, 1-decene, 1-undecene, 1-dodecene, and the like. In one or more embodiments, the ethylene may be present as a comonomer in the low crystallinity ethylene/α-olefin copolymer in an amount that ranges from 30 to 90 weight percent, or a lower limit of any of 30, 35, 40, or 50 weight percent and an upper limit of any of 55, 75, or 90 weight percent, where any lower limit can be used in combination with any upper limit, with the balance being the $C_3$-$C_{12}$ comonomer.

The amount of low crystallinity ethylene/α-olefin copolymer present in the compounded polymer composition may range, for example, from 5 to 30 wt %, and in one or more embodiments from a lower limit of any of 5, 7, 8, or 10 wt % to an upper limit of any of 15, 20, 25, or 30 wt %, where any lower limit can be used in combination with any upper limit.

The crystallinity ($X_c$) of such low crystallinity ethylene/α-olefin copolymer may be less than 40%, such as having a lower limit of any of 1, 2, 5, or 10% and an upper limit of any of 20, 30, or 40%, where any lower limit can be used in combination with any upper limit.

In one or more embodiments, the low crystallinity ethylene/α-olefin copolymer may have a MFR, measured according to ASTM D1238 using a load of 2.16 kg at 230° C., in a range of 1 to 50 g/10min, or a lower limit of any of 1, 2, or 5 g/10 min, and an upper limit of any of 20, 40, or 50 g/10min, where any lower limit can be used in combination with any upper limit.

In one or more embodiments, the low crystallinity ethylene/α-olefin copolymer may have a melting point ranging from 30 to 100° C., or a lower limit of any of 30, 40, or 50° C. to an upper limit of any of 60, 80, or 100° C., where any lower limit can be used in combination with any upper limit.

In one or more embodiments, the low crystallinity ethylene/α-olefin copolymer may include a copolymer as described in U.S. Pat. No. 8,329,825, which is herein incorporated by purpose in its entirety.

Nucleating Agent

In one or more embodiments, a nucleating agent may be added to the compounded polymer composition. Nucleating agents change crystallization temperature, crystal size, density, clarity, impact and tensile properties of polypropylene. The nucleating agent may include a metal salt such as a saturated bicyclic dicarboxylate, hexahydrophthalic acid, dibenzylidene sorbitol and dibenzylidene sorbitol derivatives, metal stearates, sodium benzoate, or combinations thereof. The nucleating agent for this application is one that is capable of changing the orientation of crystalline lamellae and/or modifies the crystal size of the polyolefin, in particular promoting isotropic crystallization in the polypropylene. In one or more embodiments, the nucleating agent may be present in the compounded polymer composition in a range from 300 to 10000 ppm, with a lower limit of any of 300, 400, 500, or 1000 ppm, and an upper limit of any of 5000, 7500, or 10000 ppm, where any lower limit can be used in combination with any upper limit. Further, as mentioned above, it is also envisioned that a nucleating agent may be present in the ICP as formed, as well as in the compounded polymer composition; thus it is contemplated that the range of 300 to 10000 ppm refers to the total amount of nucleating agent present in the compounded composition.

In one or more embodiments, the nucleating agent may have a d95 particle size that is less than 20 microns.

Filler

In one or more embodiments, compounded polymer compositions may include one or more fillers. Fillers in accordance with the present embodiments may include an antioxidant, carbon black, silicic acid powder, precipitated calcium carbonate, calcium carbonate, talc, titanium dioxide, natural fibers, glass fibers, and clay. In one or more embodiments, one or more fillers may be included at a concentration in the compounded polymer composition ranging from 0.05 wt % to 30 wt %, preferably from 3 to 30 wt %, and in one or more embodiments from a lower limit of any of 0.05, 0.1, 0.5, 1, 2, 3, 4, 5 wt % to an upper limit of any of 15, 20, 25, or 30 wt %, where any lower limit can be used in combination with any upper limit. In a preferred embodiment, the compounded polymer compositions of the present invention can include from 3 to 30 wt % of fillers selected from the group consisting of carbon black, silicic acid powder, precipitated calcium carbonate, calcium carbonate, talc, titanium dioxide, natural fibers, glass fibers, and clay. In another preferred embodiment the compounded polymer compositions of the present invention can include from 0.05 wt % to 30 wt %, preferably from 0.05 wt % to 5 wt %, of an antioxidant, and, for this embodiment wherein the filler is an antioxidant, the filler does not contain a filler selected from the group consisting of carbon black, silicic acid powder, precipitated calcium carbonate, calcium carbonate, talc, titanium dioxide, natural fibers, glass fibers, and clay.

In one or more embodiments, the inorganic filler may have a d50 particle size of no more than 5 microns and a d98 particle size of no more than 20 microns.

Other Additives

As mentioned, a number of additives may be incorporated into ICP compositions or the compounded polymer compositions in accordance with the present disclosure that may include for example, stabilizers, phosphites (for example Irgafos™ 168 from the BASF Corporation), cling additives (for example polyisobutylene), polymeric processing aids (such as Dynamar™5911 from 3M Corporation or Silquest™ PA-1 from Momentive Performance Materials), colorants, clarifiers (for example, Millad 3988i and Millad NX8000 from Milliken & Co.); antiblock agents, acid scavengers, waxes, antimicrobials, UV stabilizers, nucleating agents (for example talc, sodium benzoate, Sodium 2,2'-methylene bis-(4,6-di-tert-butyl phenyl)phosphate, 2,2'-Methyl enebis-(2,6-ditert-butylphenyl)phosphate (lithium salt), Aluminum hydroxybis [2,4,8,10-tetrakis(1,1-dimethylethyl)-6-hydroxy-12-H-dibenzo[d,g][1,3,2]dioxaphosphocin 6-oxidato], dibenzilidene sorbitol, nonitol 1,2,3-trideoxy-4,6:5,7-bis-O-[(4-propylphenyl)methylene], Cis-endobicyclo[2.2.1]heptane-2,3-dicarboxylic acid (disodium salt), 1R,2S-cyclohexanedicarboxylic acid (calcium salt), zinc stearate, pigments that act as nucleators, aromatic carboxylic acids, calcium carbonate, pimelic acid, calcium hydroxide, stearic acid, organic phosphates, and mixtures thereof), optical brighteners, long term heat agents, slip agents, pigments, processing aids, antistatic agents, polyethylene, impact modifiers, compatabilizers, as well as any combinations of the aforementioned additives. Such additives may be added to the extruder to prepare the compositions having specific properties. The extruded polymer may subsequently be used in three-dimensional printing.

ICP compositions may be formulated in some embodiments as an extruded filament or granule (or pellet) which may be used in an additive manufacturing process. Filament may have a diameter, for example, of 1.0 to 4.0 mm.

Applications

Additive manufacturing systems are used to print or otherwise build 3D parts from digital representations of the 3D parts (e.g., AMF and STL format files) using one or more additive manufacturing techniques. Generally, examples of commercially available additive manufacturing techniques include extrusion-based techniques such as fused deposition modeling (FDM), electro-photography (EP), jetting, selective laser sintering (SLS), high speed sintering (HSS), powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to print the given layer. Particular additive manufacturing techniques that may be particularly suitable for the present polymer compositions include, for example, fused deposition modeling, selective laser sintering, material jetting, or plastic freeforming.

For example, in an extrusion-based additive manufacturing system, a 3D part may be printed from a digital representation of the 3D part in a layer-by-layer manner by extruding a flowable part material. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited from a second nozzle pursuant to the generated geometry during the printing process. The support material adheres to the part material during fabrication, and is removable from the completed 3D part when the printing process is complete.

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

For example, according to fused deposition modeling, a filament or granules formed from the polymer composition discussed above are heated and extruded through an extrusion head that deposits the molten plastic in X and Y coordinates, while the build table lowers the object layer by layer in the Z direction.

Selective laser sintering uses powdered material in the build area instead of liquid or molten resin. A laser is used to selectively sinter a layer of granules, which binds the material together to create a solid structure. When the object is fully formed, it's left to cool in the machine before being removed.

Plastic freeforming, such as that offered by ARBURG GmbH and Co KG (Lossburg, Germany), operates using standard granulated plastics that are melted such as in an injection molding process. A clocked nozzle that opens and closes (up to 100 times a second) builds the component layer-by-layer from miniscule plastic droplets. Further description about such technique may be found in U.S. Pat. No. 9,039,953, which is herein incorporated by reference in its entirety.

Thus, in one or more embodiments, the polymer composition has a peak melting point (as measured by differential scanning calorimetry) of greater than 150° C.

Further, it is also understood that while an article of the present disclosure may be formed using an "additive manufacturing system", such "additive manufacturing system" refers to a system that prints, builds, or otherwise produces 3D parts and/or support structures at least in part using an additive manufacturing technique. The additive manufacturing system may be a stand-alone unit, a sub-unit of a larger system or production line, and/or may include other non-additive manufacturing features, such as subtractive-manufacturing features, pick-and-place features, two-dimensional printing features, and the like.

Further, the use of the present polymer compositions, rather than conventional polymers used in additive manufacturing, may provide greater flexibility in the products produced by the additive manufacturing methods. Specifically, for example, the articles produced by additive manufacturing may have a lower flexural modulus and excellent fatigue resistance as compared to PLA or ABS, for example, which may allow the articles to be formed into living hinge articles or articles incorporating a living hinge therein. A living hinge is a flexure bearing or hinge that is made from the same material to the two (rigid) bodies it connects, but based on its thinner geometry, it allows for bending at the hinge.

Other articles that may be formed, include, for example, packaging, rigid and flexible containers, household appliances, molded articles such as caps, bottles, cups, pouches, labels, pipes, tanks, drums, water tanks, medical devices, shelving units, and the like. Specifically, any article conventionally made from the polymer compositions of the present disclosure (using conventional manufacturing techniques) may instead be manufactured from additive manufacturing.

Testing Methodology

Intrinsic Viscosity

The intrinsic viscosity is measured according to ASTM D 445 (Standard Test Method for Kinematic Viscosity of Transparent and Opaque Liquids) in decalin at 135° C.

Crystallization half-time and thermal behavior via Differential Scanning Calorimetry (DSC)

The melting points of the polymers (Tm) are measured by Differential Scanning Calorimetry (D.S.C.) on a TA Instruments DSC-1 calorimeter, previously calibrated against indium melting points, and according to ASTM E 968, ASTM E 793, ASTM E 794, ASTM D3418 at 10° C/min. The weight of the samples in every DSC crucible is kept at 6.0+1 mg.

In order to obtain the melting point, the weighted sample is sealed into aluminium pans and heated to 200° C. at 10° C/minute. The sample is kept at 200° C. for 5 minutes to allow a complete melting of all the crystallites, then cooled to −20° C. at 10° C/minute. The peak temperature (Tc) is taken as the crystallization temperature. After standing 5 minutes at −20° C., the sample is heated for the second run time to 200° C. at 10° C/min. In this second heating run, the peak temperature (Tm) and the crystallinity are taken from the melt temperature. The theoretical value for polypropylene, which is 190 J/g, is used to calculate the crystallinity. To calculate the half-time of crystallization, the Tc result is used.

Ethylene content via Fourier Transform Infrared Spectroscopy (FTIR)

Comonomer content is measured with Fourier transform infrared spectroscopy (FTIR) calibrated with 13C-NMR. When measuring the ethylene content in polypropylene, a thin film of the sample (thickness about 300 mm) is prepared by hot-pressing. The area of —$CH_2$— absorption peak 775-670 cm-1 (0.2 to 3% ethylene) or 758-702 cm-1 (3 to 33% ethylene) is measured with Thermo Scientific Nicolet FTIR iS50 spectrometer, and sample thickness is corrected by the area between 4482-3950 cm-1.

EXAMPLES

Various examples were formulated with an ICP copolymer, a commercially available Braskem heterophasic polypropylene impact copolymer, having a disperse phase of about 28 wt % (estimated by the amorphous content measured by xylene soluble content on polypropylene, according to ASTM D5492-17) based on an ethylene-based elastomer, and a melt flow rate of 9 g/10 min., measured according to ASTM D 1238 (230° C./2.16 kg), alone and with various combinations of the ICP compounded with a nucleating agent, talc, and a low crystallinity ethylene-butylene (EB) copolymer as shown in Table 1.

TABLE 1

| | Examples | | | | | | |
|---|---|---|---|---|---|---|---|
| | 1 | 2 | 3 | 4 | 5 | 6 | 7 |
| ICP | 100 wt % | Bal. | Bal. | Bal. | Bal. | Bal. | Bal. |
| Nucleating agent | — | 600 ppm | 600 ppm | 600 ppm | 600 ppm | 600 ppm | 600 ppm |
| Talc | — | — | 10 wt % | — | 10 wt % | 20 wt % | — |
| EB | — | — | — | 10 wt % | 10 wt % | — | 20 wt % |

The example compositions were injection molded into parts and analyzed as shown in Table 2. A commercially available ABS material is used as a reference material that is frequently used in the application. ABS is an amorphous material that exhibits a combination of both low unidirectional and isotropic shrinkage. The ratio of the shrinkage normal to the flow direction and parallel to the flow direction for ABS is 1. The coefficient of linear thermal expansion is measured in a small sample cut from a compression molded plate. Samples for CLTE are subjected to a thermal conditioning (2 h at 100° C.) to reduce the residual stresses prior to the test. Measurements may be taken by TMA according to ASTM E228, ASTM E831 and ASTM D696.

TABLE 2

| Ex. | Shrinkage flow dir. (%) | Shrinkage normal to flow dir. (%) | CLTE at 100° C. (μm/m ° C.) | $X_c$ (%) |
|---|---|---|---|---|
| 1 | 1.42 | 1.22 | 151 | 44 |
| 2 | 1.19 | 1.06 | 137 | 43 |
| 3 | 1.08 | 0.89 | 131 | 40 |
| 4 | 0.08 | 0.68 | 135 | 35 |
| 5 | 0.83 | 0.85 | 130 | 35 |
| 6 | 1.13 | 0.74 | 122 | 36 |
| 7 | 0.07 | 0.58 | 150 | 34 |
| ABS | 0.4-0.7 | 0.4-0.7 | 80-110 | N/A |

Figure 2:
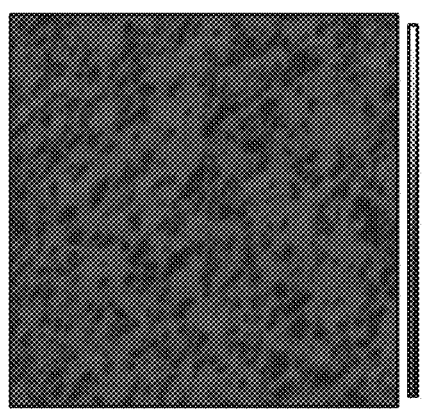
Figure 3:
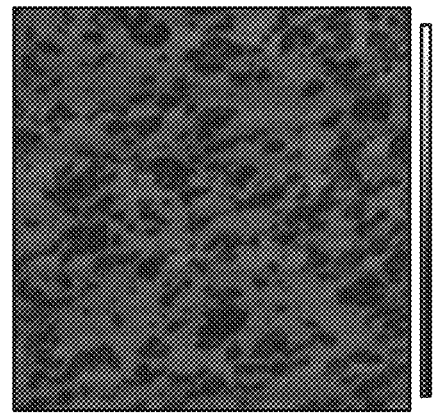
Figure 4:
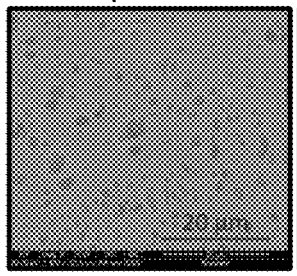
FIG. 4 shows SEM images of cross sections that have been etched with toluene to show the rubber domains. Cross sections were cryo-microtomed from parts printed using a pellet based 3D printer.
Figure 4:
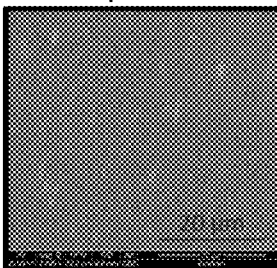
Figure 4:
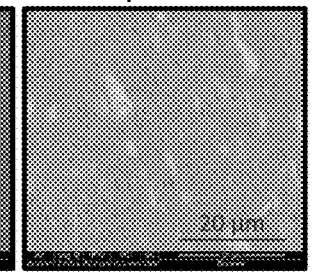
Figure 4:
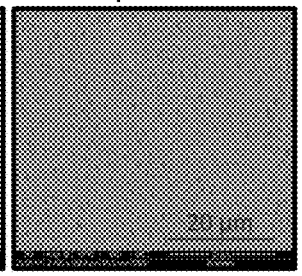

Crystallinity characterization was to evaluate crystals density, growth speed and dimensionality and demonstrate synergy among additives that impacts crystallinity and affects dimensional stability on additive manufacturing printed parts. An Avrami analysis showed that Example 5 results in formation of a higher nucleation density (presented as a ratio relative to Example 1), with a more 1 dimensional shape crystal. However, these crystals are shown to grow at a similar rate to the other similar composition. The unique crystallization kinetics of Example 5 are believed to significantly contribute to making the material more suitable for fused filament fabrication based additive manufacturing. The results are summarized in Table 3 below. Further, SEM images of injected molded plaques made of Examples 1, 4 and 5 are shown in FIGS. 1-3, and SEM images of FFF printed plaques made of Examples 1, 5, 6 and 7 are shown in FIG. 4.

TABLE 3

| Ex. | Dimensionality | Nucleation density ratio | Time to 10% Xtal (sec) |
|---|---|---|---|
| 1 | 2.2 | 1 | 134 |
| 2 | 2.08 | 4.39 | 89 |
| 3 | 2.24 | 1.2 | 113 |
| 4 | 2.25 | 1.6 | 99 |
| 5 | 1.93 | 5.6 | 110 |
| 6 | 2.3 | 1.04 | 106 |
| 7 | 2.22 | 1.8 | 99 |

Figure 5:
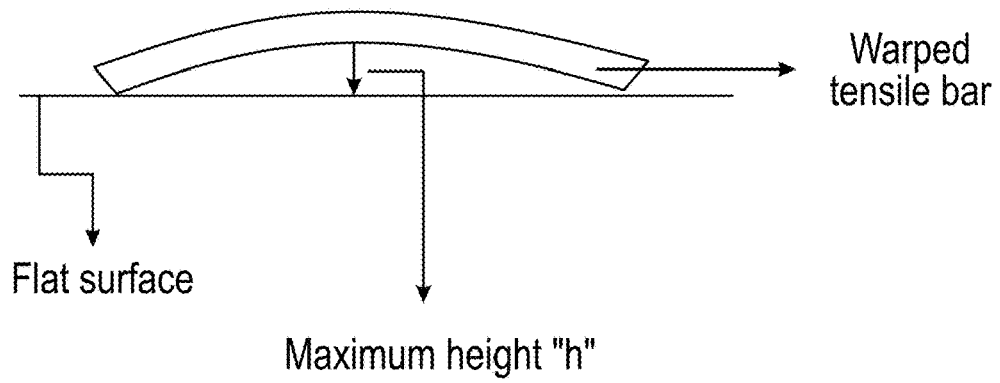
FIG. 5 shows a method used to measure warpage on a printed tensile bar.
Figure 6:
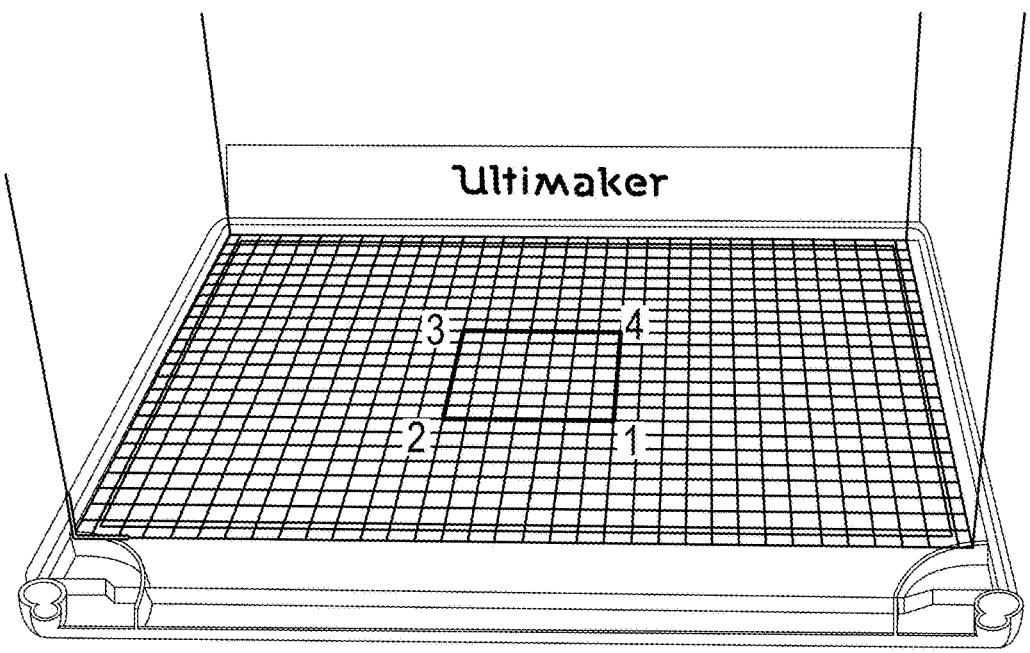
FIG. 6 shows a print orientation using 3D printing.

Tensile bars of Example 1 and 5 were printed in X-Y direction under the following conditions: printing temperature 220° C., bed temperature 23° C., print speed 4000 mm/min, 75% of grid (±45°) infill, 3 perimeter layers, 0.35 mm nozzle and 0.15mm layer height, 100% of cooling. The warpage of the printed tensile bars was measured from the deflection on the center of the printed samples (FIG. 5). Example 1 demonstrated an average warpage of 6.33 mm (SD of 0.59), whereas Example 5 demonstrated an average warpage of 2.72 mm (SD of 0.22).

To evaluate the warpage resistance rating of a compounded polymer composition in the form of a printed article (whether a compounded polymer composition or a comparative compounded polymer composition), a number of specimens are printed and measured. In this example, three specimens are printed and measured for the warpage resistance rating evaluation.

Three 60 mm×60 mm×60mm, open-ended boxes are printed with the compounded polymer composition to be evaluated. For each printing, the print orientation is X-Y. The thickness of each wall is 1 mm.

Figure 8:
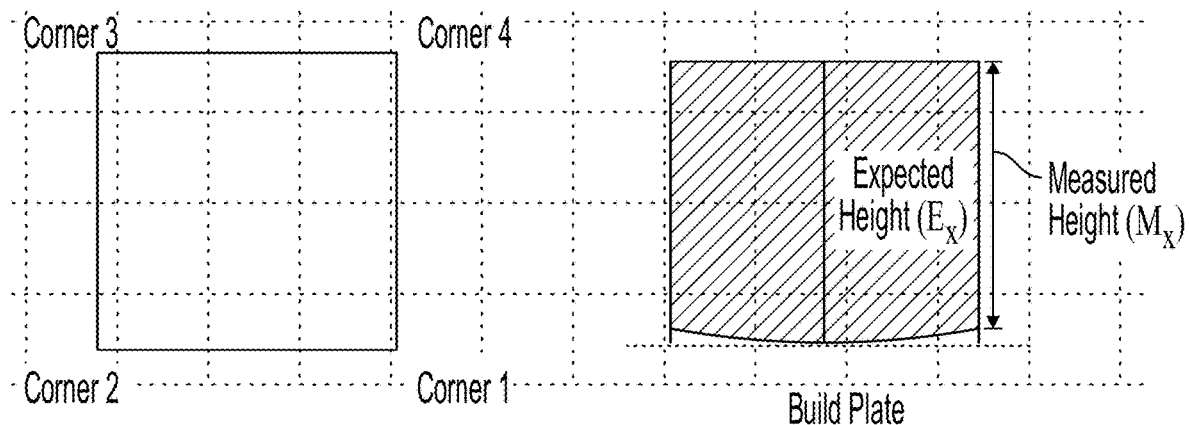
FIG. 8 provides another view and illustration for a hypothetical box for which the warpage resistance is determined, with the left panel showing the view of projecting the box onto the X-Y plane, and the right panel showing the view of the expected height from the center edge and the measured height from the corner edge.

The printing program used to print each specimen develops a model of the specimen to be printed, and the expected height for any edge of the object is defined the model. FIG. 8 shows one printed open-ended, thin-walled box, which overlays the expected height of one edge from the model. FIG. 8 also shows the measured height of the printed open-ended, thin-walled box for the same edge.

Figure 7:
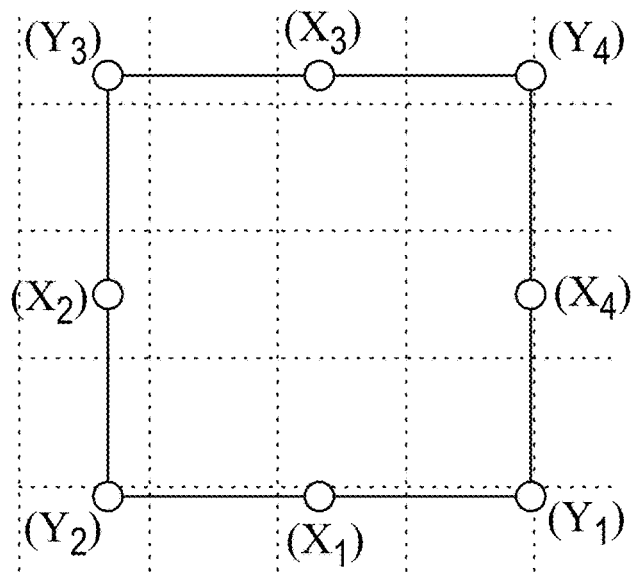
FIG. 7 illustrates an exemplary box projecting onto the X-Y plane and identifying the locations for X1, X2, X3, and X4, and Y1, Y2, Y3, and Y4, for the warpage resistance rating equation.

For the purpose of evaluating the warpage resistance rating, FIG. 7 illustrates an exemplary box projecting onto the X-Y plane and identifying the locations for $X_1$, $X_2$, $X_3$, and $X_4$, and $Y_1$, $Y_2$, $Y_3$, and $Y_4$. Each location of $X_1$, $X_2$, $X_3$, and $X_4$ represents a central edge of a box, wherein the central edge is found at the center point of a sidewall of the box, e.g., at 30 mm, ±0.5mm, from a corner edge. Each location of $Y_1$, $Y_2$, $Y_3$, and $Y_4$ represents a corner edge of a box.

To evaluate the warpage resistance rating of a particular composition, each of the printed three boxes are reviewed, and the height of the printed object on each locations of $X_1$, $X_2$, $X_3$, and $X_4$ and $Y_1$, $Y_2$, $Y_3$, and $Y_4$ are measured and recorded. The measurements are done 48 hours after the boxes are printed. For each of the three boxes, the heights of the central edges from all sidewalls, i.e., the heights at the locations of $X_1$, $X_2$, $X_3$, and $X_4$, are compared and the greatest height (or the greatest value from $X_1$, $X_2$, $X_3$, and $X_4$) is identified and recorded. For each of the three boxes, the heights of the corner edges from all sidewalls, i.e., the heights at the locations of $Y_1$, $Y_2$, $Y_3$, and $Y_4$, are compared and the shortest or least height (or the smallest value from $Y_1$, $Y_2$, $Y_3$, and $Y_4$) is identified and recorded. Thereafter, the warpage value, WS, for each box is determined. The warpage values for boxes 1, 2, and 3, are $WS_1$, $WS_2$, and $WS_3$, respectively.

The warpage resistance rating is thus given by the following equation:

$$\text{warpage resistance rating} = \frac{WS_1 + WS_2 + WS_3}{N}$$

In the equation, N is the total number of printed articles measured for warpage resistance rating evaluation. In this case, N is 3.

$WS_1$=Max (X1, X2, X3, X4)1−Min (Y1, Y2, Y3, Y4)1 for a first printed box.

WS2=Max (X1, X2, X3, X4)2−Min (Y1, Y2, Y3, Y4)2 for a second printed box.

WS3=Max (X1, X2, X3, X4)3−Min (Y1, Y2, Y3, Y4)3 for a third printed box.

As noted above, X1, X2, X3, and X4, respectively, represent a height of a first central edge, a height of a second central edge, a height of a third central edge, and a height of a fourth central edge, for each of the first, second, and third printed box. Y1, Y2, Y3, and Y4, respectively, represent a height of a first corner edge, a height of a second corner edge, a height of a third corner edge, and a height of a fourth corner edge, for each of the first, second, and third printed box.

Accordingly, Max (X1, X2, X3, X4)1 represents the maximum value of X1, X2, X3, and X4, for the first printed box. Max (X1, X2, X3, X4)2 represents the maximum value of X1, X2, X3, and X4, for the second printed box. Max (X1, X2, X3, X4)3 represents the maximum value of X1, X2, X3, and X4, for the third printed box. Min (Y1, Y2, Y3, Y4)1 represents the minimum value of Y1, Y2, Y3, and Y4, for the first printed box. Min (Y1, Y2, Y3, Y4)1 represents the minimum value of Y1, Y2, Y3, and Y4, for the second printed box. Min (Y1, Y2, Y3, Y4)1 represents the minimum value of Y1, Y2, Y3, and Y4, for the third printed box.

FIG. 8 provides another view and illustration for a hypothetical box for which the warpage resistance is determined according to the above equation. As shown in the right view of FIG. 8, the heights of the central and corner edges are measured from the bottom edge of the box that touches the build plate, not from the build plate itself. Because the thermodynamic warpage typically occurs the least in the center edge of the box, the height measured at the center edge for each sidewall of the printed box mostly corresponds to the expected height defined by the model; whereas the height measured at the corner edge for each sidewall of the printed box often records the highest possible warp, because the thermodynamic warpage is typically its highest at sharp corners where stresses are concentrated. Accordingly, in the equation above, Max ($X_1$, $X_2$, $X_3$, $X_4$) would record a value approximate the expected height defined by the model ($E_x$), and Min ($Y_1$, $Y_2$, $Y_3$, $Y_4$) would record the lowest measured height ($M_x$). The warpage calculated for each printed box, WS, would therefore be determined from a measured height that has the greatest difference from the expected height. The average value of the WS values determined for all three boxes would be the warpage resistance rating of that particular feedstock used to print the boxes.

Measurements of the Warpage Resistance Rating

To illustrate the minimized warpage exhibited by the compounded polymer composition according to this invention, the warpage resistance rating of the inventive compounded polymer composition in the form of a printed article was determined, and compared against the warpage resistance rating of six other variations of the claimed composition of the compounded polymer composition (Table 1). The warpage resistance rating for the inventive compounded polymer composition and the comparative compounded polymer composition were determined based on the method described previously.

The filaments from each of the inventive compounded polymer composition and the comparative compounded polymer composition were then loaded to a Fused Filament Fabrication based desktop 3D printer Maker Select V2 (Monoprice), and printed with the following printing parameters listed in Table 4. Magigoo PP (Magigoo) was used as bed adhesion solution. Examples 1-5 were printed using the predefined slicing parameters listed in Table 4 to maintain consistency between various feedstock materials and were printed at the center of the printer bed.

TABLE 4

Predefined Slicing Parameters for printing Examples 1 to 5.

| | |
|---|---|
| Nozzle diameter (mm) | 0.4 |
| Layer Height (mm) | 0.2 |
| Wall Count (#) | 3 |
| Top/Bottom Walls (#) | 0 |
| Infill Pattern | standard |
| Print Speed (mm/s) | 45 |
| Initial Print Speed (mm/s) | 20 |
| Slower Layers (#) | 2 |
| Printing temperature (° C.) | 230 |
| Bed Temperature Initial (° C.) | 100 |
| Bed Temperature (° C.) | 85 |
| Cooling Speed (%) | 50 |

To evaluate the warpage resistance rating of each of the compounded polymer composition in the form of a printed article, three 60 mm×60 mm×60mm, open-ended boxes were printed for each of the additive-manufacture feedstock to be evaluated. For each printing, the print orientation is X-Y, and the thickness of each wall is 1 mm.

The warpage resistance rating for each compounded polymer composition was determined according to the method described previously.

For the compounded polymer composition (Example 1), the warpage resistance parameters determined are listed in Table 5. The warpage resistance rating for Example 1 was therefore determined to be $$\frac{2.43 + 2.20 + 2.06}{3} = 2.230$$

TABLE 5

The warpage resistance parameters determined for Example 1.

Warpage Specimen 1 (WS$_1$)

| | | | | | |
|---|---|---|---|---|---|
| $Y_1$ | 57.2 | $X_1$ | 59.01 | Min Y | 56.58 |
| $Y_2$ | 56.58 | $X_2$ | 58.99 | Max X | 59.01 |
| $Y_3$ | 57.21 | $X_3$ | 58.72 | WS$_1$ | 2.43 |
| $Y_4$ | 57.2 | $X_4$ | 58.98 | | |

Warpage Specimen 2 (WS$_2$)

| | | | | | |
|---|---|---|---|---|---|
| $Y_1$ | 56.69 | $X_1$ | 58.89 | Min Y | 56.69 |
| $Y_2$ | 57.24 | $X_2$ | 58.47 | Max X | 58.89 |
| $Y_3$ | 56.95 | $X_3$ | 58.82 | WS$_2$ | 2.20 |
| $Y_4$ | 57.24 | $X_4$ | 58.67 | | |

Warpage Specimen 3 (WS$_3$)

| | | | | | |
|---|---|---|---|---|---|
| $Y_1$ | 57.23 | $X_1$ | 59.01 | Min Y | 56.95 |
| $Y_2$ | 56.95 | $X_2$ | 58.91 | Max X | 59.01 |
| $Y_3$ | 57.13 | $X_3$ | 58.97 | WS$_3$ | 2.06 |
| $Y_4$ | 57.64 | $X_4$ | 58.88 | | |

For the compounded polymer composition (Example 2), the warpage resistance parameters determined are listed in Table 6. The warpage resistance rating for Example 2 was therefore determined to be $$\frac{2.34 + 2.7 + 2.19}{3} = 2.410.$$

TABLE 6

The warpage resistance parameters determined for Example 2.

Warpage Specimen 1 (WS$_1$)

| | | | | | |
|---|---|---|---|---|---|
| $Y_1$ | 57 | $X_1$ | 59.21 | Min Y | 56.87 |
| $Y_2$ | 57.48 | $X_2$ | 58.94 | Max X | 59.21 |
| $Y_3$ | 57.61 | $X_3$ | 59.09 | WS$_1$ | 2.34 |
| $Y_4$ | 56.87 | $X_4$ | 58.93 | | |

Warpage Specimen 2 (WS$_2$)

| | | | | | |
|---|---|---|---|---|---|
| $Y_1$ | 57.24 | $X_1$ | 58.88 | Min Y | 56.65 |
| $Y_2$ | 56.65 | $X_2$ | 58.65 | Max X | 59.35 |
| $Y_3$ | 57.33 | $X_3$ | 59.35 | WS$_2$ | 2.7 |
| $Y_4$ | 57.25 | $X_4$ | 59.16 | | |

Warpage Specimen 3 (WS$_3$)

| | | | | | |
|---|---|---|---|---|---|
| $Y_1$ | 57.12 | $X_1$ | 58.86 | Min Y | 56.83 |
| $Y_2$ | 57.34 | $X_2$ | 58.63 | Max X | 59.02 |
| $Y_3$ | 57.55 | $X_3$ | 59.02 | WS$_3$ | 2.19 |
| $Y_4$ | 56.83 | $X_4$ | 58.79 | | |

For the compounded polymer composition (Example 3), the warpage resistance parameters determined are listed in Table 7. The warpage resistance rating for Example 3 was therefore determined to be $$\frac{1.8 + 1.26 + 1.36}{3} = 1.473.$$

TABLE 7

The warpage resistance parameters determined for Example 3.

Warpage Specimen 1 (WS$_1$)

| | | | | | |
|---|---|---|---|---|---|
| $Y_1$ | 57.58 | $X_1$ | 58.98 | Min Y | 57.41 |
| $Y_2$ | 57.76 | $X_2$ | 59.21 | Max X | 59.21 |
| $Y_3$ | 57.41 | $X_3$ | 59.18 | WS$_1$ | 1.8 |
| $Y_4$ | 57.47 | $X_4$ | 59.06 | | |

TABLE 7-continued

The warpage resistance parameters
determined for Example 3.

Warpage Specimen 2 (WS$_2$)

| | | | | | | |
|---|---|---|---|---|---|---|
| $Y_1$ | 57.88 | $X_1$ | 59.11 | Min Y | 57.88 |
| $Y_2$ | 57.98 | $X_2$ | 58.82 | Max X | 59.14 |
| $Y_3$ | 58.12 | $X_3$ | 59.14 | WS$_2$ | 1.26 |
| $Y_4$ | 58.1 | $X_4$ | 59.09 | | |

Warpage Specimen 3 (WS$_3$)

| | | | | | | |
|---|---|---|---|---|---|---|
| $Y_1$ | 57.92 | $X_1$ | 58.89 | Min Y | 57.87 |
| $Y_2$ | 57.87 | $X_2$ | 59.01 | Max X | 59.23 |
| $Y_3$ | 57.99 | $X_3$ | 59.23 | WS$_3$ | 1.36 |
| $Y_4$ | 58.07 | $X_4$ | 59.17 | | |

For the compounded polymer composition (Example 4), the warpage resistance parameters determined are listed in Table 8. The warpage resistance rating for Example 4 was therefore determined to be $$\frac{0.84 + 0.79 + 0.89}{3} = 0.840.$$

TABLE 8

The warpage resistance parameters
determined for Example 4.

Warpage Specimen 1 (WS$_1$)

| | | | | | | |
|---|---|---|---|---|---|---|
| $Y_1$ | 57.58 | $X_1$ | 58.14 | Min Y | 57.41 |
| $Y_2$ | 57.76 | $X_2$ | 58.25 | Max X | 58.25 |
| $Y_3$ | 57.41 | $X_3$ | 58.08 | WS$_1$ | 0.84 |
| $Y_4$ | 57.47 | $X_4$ | 58.13 | | |

Warpage Specimen 2 (WS$_2$)

| | | | | | | |
|---|---|---|---|---|---|---|
| $Y_1$ | 57.88 | $X_1$ | 58.27 | Min Y | 57.48 |
| $Y_2$ | 57.48 | $X_2$ | 58.18 | Max X | 58.27 |
| $Y_3$ | 57.63 | $X_3$ | 58.21 | WS$_2$ | 0.79 |
| $Y_4$ | 57.81 | $X_4$ | 58.04 | | |

Warpage Specimen 3 (WS$_3$)

| | | | | | | |
|---|---|---|---|---|---|---|
| $Y_1$ | 57.62 | $X_1$ | 58.07 | Min Y | 57.4 |
| $Y_2$ | 57.73 | $X_2$ | 58.29 | Max X | 58.29 |
| $Y_3$ | 57.4 | $X_3$ | 58.11 | WS$_3$ | 0.89 |
| $Y_4$ | 57.59 | $X_4$ | 58.09 | | |

For the compounded polymer composition (Example 5), the warpage resistance parameters determined are listed in Table 9. The warpage resistance rating for Example 5 was therefore determined to be $$\frac{1.03 + 1.08 + 0.94}{3} = 1.017.$$

TABLE 9

The warpage resistance parameters
determined for Example 5.

Warpage Specimen 1 (WS$_1$)

| | | | | | | |
|---|---|---|---|---|---|---|
| $Y_1$ | 58.26 | $X_1$ | 58.85 | Min Y | 58.03 |
| $Y_2$ | 58.03 | $X_2$ | 59.06 | Max X | 59.06 |
| $Y_3$ | 58.32 | $X_3$ | 58.4 | WS$_1$ | 1.03 |
| $Y_4$ | 58.16 | $X_4$ | 58.76 | | |

TABLE 9-continued

The warpage resistance parameters
determined for Example 5.

Warpage Specimen 2 (WS$_2$)

| | | | | | | |
|---|---|---|---|---|---|---|
| $Y_1$ | 58.13 | $X_1$ | 59.11 | Min Y | 58.03 |
| $Y_2$ | 58.42 | $X_2$ | 58.47 | Max X | 59.11 |
| $Y_3$ | 58.22 | $X_3$ | 58.82 | WS$_2$ | 1.08 |
| $Y_4$ | 58.03 | $X_4$ | 58.67 | | |

Warpage Specimen 3 (WS$_3$)

| | | | | | | |
|---|---|---|---|---|---|---|
| $Y_1$ | 58.19 | $X_1$ | 59.01 | Min Y | 58.07 |
| $Y_2$ | 58.07 | $X_2$ | 58.91 | Max X | 59.01 |
| $Y_3$ | 58.34 | $X_3$ | 58.46 | WS$_3$ | 0.94 |
| $Y_4$ | 58.26 | $X_4$ | 58.88 | | |

As shown above in Tables 5-9, variation of the material composition led to different responses on warpage resistance of printed parts. Example 1 is composed of polypropylene and is the reference for the warpage resistance of an unmodified polypropylene grade. Example 2 exhibited increased warpage in comparison with Example 1, which is not beneficial for the 3D printed part. Example 3 showed a decrease on warpage in comparison with Sample 1, but not as significant as the warpage reduction noticed on Examples 4 and 5. The results for Example 4 and 5 indicate that a compounded polymer composition of the present invention will exhibit far less warpage in a printed part thereof, compared to compositions that do not include at least one component of inventive compounded polymer composition discussed herein.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f), for any limitations of any of the claims herein, except for those in which the claim expressly uses the words 'means for' together with an associated function.

What is claimed:

1. A three-dimensional printed article formed from a compounded polymer composition, wherein the three-dimensional printed article his a unidimensional shrinkage of less than 1.0% in each of a flow direction and a normal to the flow direction, an isotropic shrinkage ratio in a range of 0.8 to 1.2, a coefficient of linear thermal expansion, measured according to ASTM E381 at 100° C., of less than 150 μm/m ° C.

2. The three-dimensional printed article of claim 1, wherein the compounded polymer composition comprises an impact copolymer (ICP) having a matrix phase that is a propylene-based polymer or copolymer; and a dispersed phase in the matrix phase, the dispersed phase comprising an ethylene-based copolymer having a C3-C12 comonomer, wherein the dispersed phase has a different composition than that of the matrix phase.

3. The three-dimensional printed article of claim 1, wherein the compounded polymer composition comprises:
an impact copolymer comprising:
a matrix phase comprising a propylene-based polymer or copolymer; and
a dispersed phase in the matrix phase, the dispersed phase comprising an ethylene-based copolymer, the ethylene-based copolymer having a C3-C12 comonomer, wherein the dispersed phase has a different composition than the matrix phase;
a low crystalline ethylene/α-olefin copolymer;
a nucleating agent; and
filler.

4. The three-dimensional printed article of claim 3, wherein the impact copolymer forms at least 50 wt % of the compounded polymer composition.

5. The three-dimensional printed article of claim 3, wherein the dispersed phase comprises an ethylene-propylene rubber.

6. The three-dimensional printed article of claim 3, wherein the low crystalline ethylene/α-olefin copolymer is an ethylene-butylene elastomer.

7. The three-dimensional printed article of claim 3, wherein each of the low crystalline ethylene/α-olefin copolymer and the filler is present in amounts ranging from 3 to 30 wt % of the compounded polymer composition, wherein a total of the low crystalline ethylene/α-olefin copolymer and the filler is no more than 50 wt % of the compounded polymer composition.

8. The three-dimensional printed article of claim 3, wherein the dispersed phase forms elongated domains within the matrix phase such that an aspect ratio of a majority of areas formed by the dispersed phase in etched SEM images is greater than 1.

9. The three-dimensional printed article of claim 3, wherein the nucleating agent is present in an amount ranging from 300 to 10000 ppm.

10. The three-dimensional printed article of claim 3, wherein the filler is a talc, and wherein the talc has a d50 particle size of no more than 5 microns and a d98 particle size of no more than 20 microns.

11. The three-dimensional printed article of claim 3, comprising from 0.05 wt % to 30 wt % of the filler, and the filler is at least one member selected from the group consisting of an antioxidant, carbon black, silicic acid powder, precipitated calcium carbonate, calcium carbonate, talc, titanium dioxide, natural fibers, glass fibers, and clay.

12. The three-dimensional printed article of claim 3, wherein the filler is an antioxidant, and is present in an amount of from 0.05 wt % to 30 wt %, and the filler does not contain a member selected from the group consisting of carbon black, silicic acid powder, precipitated calcium carbonate, calcium carbonate, talc, titanium dioxide, natural fibers, glass fibers, and clay.

13. The three-dimensional printed article of claim 1, wherein the three-dimensional printed article has a warpage of less than 10 mm measured as a deflection on a center of a three-dimensional printed tensile bar specimen printed in X-Y direction under the following conditions: printing temperature 220° C., bed temperature 23° C., print speed 4000 mm/min, 75% of grid (±45°) infill, 3 perimeter layers, 0.35 mm nozzle and 0.15 mm layer height, 100% of cooling.

14. The three-dimensional printed article of claim 1, wherein the three-dimensional printed article has a warpage resistance rating of less than 1.5 mm, measured according to the following equation and 48 hours after printing the three-dimensional printed article:

wherein:

$$\text{warpage resistance rating} = \frac{\sum_{i=1}^{N} WS_i}{N}$$

$\sum_{i+1}^{N} WS_i$ sums values of WSi, starting at $WS_1$ and ending with $WS_N$, N is total number of printed articles measured for warpage resistance rating evaluation, i is an $i^{th}$ printed article measured, $WSi = \text{Max}(X_1,X_2,X_3,X_4)_i - \text{Min}(Y_1,Y_2,Y_3,Y_4)_i$ for a $i^{th}$ printed article measured, $X_1$, $X_2$, $X_3$, and $X_4$, respectively, represent a height of a first central edge, a height of a second central edge, a height of a third central edge, and a height of a fourth central edge, of the $i^{th}$ printed article measured, $Y_1$, $Y_2$, $Y_3$, and $Y_4$, respectively, represent a height of a first corner edge, a height of a second corner edge, a height of a third corner edge, and a height of a fourth corner edge, of the $i^{th}$ printed article measured, $\text{Max}(X_1,X_2,X_3,X_4)_i$ represents a maximum value of $X_1$, $X_2$, $X_3$, and $X_4$, for the $i^{th}$ printed article measured, and $\text{Min}(Y_1,Y_2,Y_3,Y_4)_i$ represents a minimum value of $Y_1$, $Y_2$, $Y_3$, and $Y_4$, for the $i^{th}$ printed article measured, wherein each printed article measured for warpage resistance rating evaluation is a 60 mm×60 mm×60 mm cubic box, each side of the cubic box having a thickness of 1 mm.

15. The three-dimensional printed article of claim 1, wherein, in the three-dimensional printed article, the compounded polymer composition comprises a plurality of crystals dispersed therein, wherein the plurality of crystals have a dimensionality, measured according to Avrami growth dimensionality value (n), of less than 2.

16. The three-dimensional printed article of claim 1, wherein a ratio of the nucleation density (ND) of the compounded polymer composition to the ICP satisfies the following:

$$\frac{ND_{compound}}{ND_{impact\ copolymer}} \geq 4$$

wherein ND is measured according the Avrami method and $ND_{compound}$ refers to the nucleation density of the compounded polymer composition and $ND_{impact\ copolymer}$ refers to the nucleation density of a comparative impact copolymer.

17. The three-dimensional printed article of claim 1, wherein the article is printed by a method comprising:
(1) supplying the a filament comprising the compounded polymer composition to a printing head;
(2) ejecting a hot melt of the filament from the printing head;
(3) solidifying the hot melt to form a printing layer; and
(4) repeating (1) to (3) to create a stack of printing layers.

18. The three-dimensional printed article of claim 1, wherein the article is printed by a method comprising:
(1) supplying a pellet comprising the compounded polymer composition to a printing head;
(2) ejecting a hot melt of the pellet from the printing head;

(3) solidifying the hot melt to form a printing layer; and
(4) repeating (1) to (3) to create a stack of printing layers.

\* \* \* \* \*